United States Patent
Brehm et al.

(10) Patent No.: US 12,497,491 B2
(45) Date of Patent: Dec. 16, 2025

(54) AQUEOUS DISPERSIONS OF AMINO-FUNCTIONALIZED ORGANOPOLYSILOXANES PRE-CROSSLINKED WITH OXALATOPOLYETHERS

(71) Applicant: Wacker Chemie AG, Munich (DE)

(72) Inventors: Christof Brehm, Munich (DE); Ernst Selbertinger, Munich (DE); Johannes Zirzlmeier, Munich (DE)

(73) Assignee: Wacker Chemie AG, Munich (DE)

( * ) Notice: Subject to any disclaimer, the term of this patent is extended or adjusted under 35 U.S.C. 154(b) by 484 days.

(21) Appl. No.: 18/030,508

(22) PCT Filed: Oct. 13, 2020

(86) PCT No.: PCT/EP2020/078803
§ 371 (c)(1),
(2) Date: Apr. 6, 2023

(87) PCT Pub. No.: WO2022/078580
PCT Pub. Date: Apr. 21, 2022

(65) Prior Publication Data
US 2023/0374224 A1 Nov. 23, 2023

(51) Int. Cl.
*C08G 77/26* (2006.01)
*C08G 65/333* (2006.01)
*C08L 83/12* (2006.01)
*D06M 15/647* (2006.01)

(52) U.S. Cl.
CPC ....... *C08G 77/26* (2013.01); *C08G 65/33324* (2013.01); *C08L 83/12* (2013.01); *D06M 15/647* (2013.01); C08G 2650/04 (2013.01); C08G 2650/20 (2013.01); C08L 2201/54 (2013.01); C08L 2203/12 (2013.01); C08L 2203/16 (2013.01); C08L 2312/00 (2013.01)

(58) Field of Classification Search
CPC ............. C08G 77/26; C08G 65/33324; C08G 2650/04; C08G 2650/20; C08L 2201/54; C08L 2203/12; C08L 2203/16; C08L 2312/00; C08L 83/12; D06M 15/647

USPC ......................................................... 524/838
See application file for complete search history.

(56) References Cited

U.S. PATENT DOCUMENTS

| 7,501,184 | B2 | 3/2009 | Leir et al. | |
| 8,637,614 | B2* | 1/2014 | Gorodisher | ............ C09J 163/00 525/529 |
| 2008/0064813 | A1 | 3/2008 | Schneider | |
| 2008/0318058 | A1* | 12/2008 | Sherman | ................ C09J 183/08 528/26 |

FOREIGN PATENT DOCUMENTS

WO   WO-2019114953 A1 *  6/2019   ........ D06M 15/6436

OTHER PUBLICATIONS

Naoaki Fukadai et al ["Synthesis of Macrocyclic Amides and Their Intermediate 2 : 1 and 3 : 2 Reaction Compounds from Diethyl Oxalate and Ethereal Oxygen-Containing Diamines", Bulletin of the Chemical Society of Japan, Chemical Society of Japan, Nippon Kagakukai, JP, vol. 69, No. 5, Jan. 1, 1996 (Jan. 1, 1996)].*
H.-J. Lautenschlager et al., Textil Praxis International, vol. 47, 5, 1992, pp. 460-461.
R. Becker et al., SOFW-Journal, vol. 139, 9, pp. 36-38 (2013).
N. Fukada, Bull. Chem. Soc. Jpn., 69, pp. 1397-1401 (1996).
Ullmann's Encyclopedia of Industrial Chemistry, CD-ROM edition 2011, Wiley-VCH, "Emulsions".
G. Engelhardt, H. Jancke: "On the 1H-, 13C- and 29Si NMR chemical shifts of certain linear, branched and cyclic methylsiloxane compounds". J. Organom et al. Chem. 28 (1971), pp. 293-300.
Chapter 8—NMR spectroscopy of organosilicon compounds, Elizabeth A. Williams, The Chemistry of Organic Silicon Compounds, (1989) John Wiley and Sons Ltd, pp. 511-533.

* cited by examiner

*Primary Examiner* — Kelechi C Egwim

(57) ABSTRACT

An aqueous dispersion includes precrosslinked organopolysiloxanes, emulsifiers, and water. The precrosslinked organopolysiloxanes include units of the formula $R_2SiO_{2/2}$ (I), and on average at least one structural unit of the formula $SiR^1O_{2/2}$—Y—$SiR^1O_{2/2}$ (III) where Y is a divalent radical of the formula —$R^2$—[$NR^3$—$R^4$—]$_n NR^3$—C(O)—C(O)—$NR^3$—Z—$NR^3$—C(O)—C(O)—$NR^3$—[$R^4$—$NR^3$—]$_n R^2$—.

12 Claims, No Drawings

AQUEOUS DISPERSIONS OF AMINO-FUNCTIONALIZED ORGANOPOLYSILOXANES PRE-CROSSLINKED WITH OXALATOPOLYETHERS

CROSS-REFERENCE TO RELATED APPLICATION

This application is a U.S. National Phase Application of PCT/EP2020/078803, filed Oct. 13, 2020, the contents of which is hereby incorporated by reference in its entirety.

BACKGROUND

The invention relates to aqueous dispersions of precrosslinked organopolysiloxanes, their production and the use thereof in compositions for treating substrates, preferably fibrous substrates.

Organopolysiloxanes are used in numerous consumer products in order to achieve a particular benefit. Examples are particular softness or smoothness, improved tactile qualities, reduction of creases, influencing of luster properties, improvement of perceived color, color protection properties, reduction of electrostatic charges, or protective properties for hair or fibers under thermal loading.

The use of organopolysiloxanes, especially amino-functionalized organopolysiloxanes, in textile finishing is long-established prior art, as reported for example in H. J. Lautenschlager, Textil Praxis International, volume 47, 5, 1992, pp. 460-461.

The use of organopolysiloxanes, especially amino-functionalized organopolysiloxanes, in textile care products is reported by R. Becker in SOFW-Journal, volume 139, 9, pp. 36-38. These amino-functionalized organopolysiloxanes are noncrosslinked products.

According to US 2008/0064813 A1, aqueous dispersions of precrosslinked organopolysiloxanes are obtained without the accompanying use of metal-containing catalysts, by reaction of amino-functional organopolysiloxanes, containing alkoxy or hydroxyl groups, with reactive alkoxysilanes. Following application of the dispersions to substrates and evaporation of the water, elastomeric films are obtained. This elastic effect can also be utilized for reducing textile creases.

The disadvantage of such exclusively amino-functionalized precrosslinked organopolysiloxanes is their hydrophobic effect on the textiles.

Siloxanes with hydrophilic modification are known. According to WO 2019/114953 A1, they are linear copolymers of oxalamidoester-terminated organopolysiloxanes with amino-terminated polyethers. They exhibit significantly boosted hydrophilicity relative to exclusively amino-functionalized organopolysiloxanes. On account of their linear structure, however, they do not exhibit any elastic effect.

U.S. Pat. No. 7,501,184 describes copolymers which are obtained by reaction of linear organopolysiloxanes, terminated with oxalamide ester groups, with organic diamines. High-viscosity to solid copolymers are obtained which are used in adhesives, more particularly as hotmelt adhesives. These high-viscosity products cannot be emulsified stably and can consequently not be used for treating fibrous substrates, such as textiles. On account of their linear structure, moreover, they do not exhibit an elastic effect.

The object was to provide precrosslinked organopolysiloxanes, more particularly aqueous dispersions of precrosslinked organopolysiloxanes, that do not have the disadvantages stated above, that can be prepared inexpensively, which preferably form an elastomeric film after removal of the water, and which can be used in compositions for treating substrates, preferably fibrous substrates, more particularly textiles. The object, further, was to provide compositions for treating substrates, preferably fibrous substrates, more particularly textiles, in order to clean and care for them, to endow them with improved properties, such as good hydrophilicity properties, for example. The object is achieved by the invention.

BRIEF SUMMARY

Embodiments of an aqueous dispersion are provided. In an embodiment, the aqueous dispersion includes precrosslinked organopolysiloxanes, emulsifiers, and water. In this embodiment, the precrosslinked organopolysiloxanes comprise units of the formula $R_2SiO_{2/2}$ (I), and on average at least one structural unit of the formula $SiR^1O_{2/2}$—Y—$SiR^1O_{2/2}$ (III), where
Y is a divalent radical of the formula

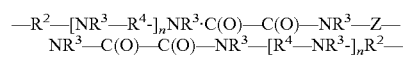

Z is identical or different and is a divalent organic radical containing a polyoxyalkylene group, Z preferably being a radical of the formula-$(R^5O)_m$—$R^6$—, R may be identical or different and is a monovalent, unsubstituted or substituted, saturated or unsaturated hydrocarbon radical having 1 to 18 carbon atoms, $R^1$ may be identical or different and is a radical R or a radical-O—$R^7$, $R^2$ is an SiC-bonded, divalent linear or branched hydrocarbon radical having 1 to 18 carbon atoms, $R^3$ is a hydrogen atom, an alkyl radical having 1 to 8 carbon atoms or an acyl radical, $R^4$ is a divalent hydrocarbon radical having 1 to 6 carbon atoms, $R^5$ is identical or different and is a $C_1$-$C_{10}$ alkylene radical, $R^6$ is a $C_1$-$C_{10}$ alkylene radical, $R^7$ may be identical or different and is hydrogen or a monovalent hydrocarbon radical which has 1 to 18 carbon atoms and may be interrupted by one or more separate oxygen atoms, n is 0, 1, 2, 3 or 4, and
m is an integer and is on average 1 to 80.

DETAILED DESCRIPTION

A subject of the invention are aqueous dispersions, preferably aqueous emulsions, comprising
(1) precrosslinked organopolysiloxanes which comprise units of the formula $$R_2SiO_{2/2} \qquad (I),$$

and on average at least one structural unit, preferably at least two structural units, of the formula $$SiR^1O_{2/2}—Y—SiR^1O_{2/2} \qquad (III)$$

where
Y is a divalent radical of the formula

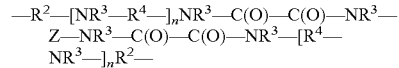

Z is identical or different and is a divalent organic radical containing a polyoxyalkylene group, Z preferably being a radical of the formula —$(R^5O)_m$—$R^6$—, R may be identical or different and is a monovalent, unsubstituted or substituted, saturated or unsaturated hydrocarbon radical having 1 to 18 carbon atoms, $R^1$ may be identical or different and is a radical R or a radical —O—$R^7$, $R^2$ is an SiC-bonded, divalent linear or branched hydrocarbon radical having 1 to 18 carbon atoms, preferably an alkylene radical having 3 to 10 carbon atoms, $R^3$ is a hydrogen atom, an alkyl radical having 1 to 8 carbon atoms or an acyl radical, such as acetyl radical, preferably a hydrogen atom, $R^4$ is a divalent hydrocarbon radical having 1 to 6 carbon atoms, preferably an alkylene radical having 1 to 6 carbon atoms, $R^5$ is identical or different and is a $C_1$-$C_{10}$ alkylene radical, preferably a $C_2$-$C_3$ alkylene radical, more preferably an ethylene or isopropylene radical, and $R^6$ is a $C_1$-$C_{10}$ alkylene radical, preferably a $C_2$-$C_3$ alkylene radical, more preferably an ethylene or isopropylene radical, $R^7$ may be identical or different and is hydrogen or a monovalent hydrocarbon radical which has 1 to 18 carbon atoms and may be interrupted by one or more separate oxygen atoms, n is 0, 1, 2, 3 or 4, preferably 0 or 1, m is an integer and is on average 1 to 80, preferably 2 to 50, (2) emulsifiers, and (3) water.

The dispersions of the invention contain preferably at least 5 wt %, more preferably at least 10 wt %, and preferably at most 60.0 wt %, more preferably at most 45 wt %, very preferably at most 35 wt %, of crosslinked organopolysiloxanes (1).

The dispersions of the invention contain preferably at least 0.5 wt %, more preferably at least 0.8 wt %, very preferably at least 1.2 wt %, and preferably at most 20 wt %, more preferably at most 15 wt %, very preferably at most 10 wt %, of emulsifiers (2).

The dispersions of the invention contain preferably at least 1 wt %, more preferably at least 5 wt %, more particularly at least 10 wt %, and preferably at most 94.5 wt %, more preferably at most 85 wt %, more particularly at most 80 wt %, of water (3).

A further subject of the invention are precrosslinked organopolysiloxanes which comprise units of the formula $R_2SiO_{2/2}$ (I), and on average at least one structural unit, preferably at least two structural units, of the formula $SiR^1O_{2/2}$—Y—$SiR^1O_{2/2}$ (III)

where

Y is a divalent radical of the formula

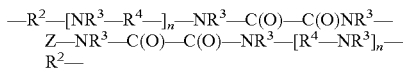

R, $R^1$, $R^2$, $R^3$, $R^4$, Z and n have the meaning indicated for them above.

The precrosslinked organopolysiloxanes (1) may additionally comprise structural units of the formula $R^1ASiO_{2/2}$ (II)

where

A may be identical or different and is a radical of the formula

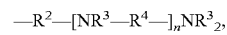

$R^2$ is an SiC-bonded, divalent linear or branched hydrocarbon radical having 1 to 18 carbon atoms, preferably an alkylene radical having 3 to 10 carbon atoms, $R^3$ is a hydrogen atom, an alkyl radical having 1 to 8 carbon atoms or an acyl radical, such as acetyl radical, preferably a hydrogen atom, $R^4$ is a divalent hydrocarbon radical having 1 to 6 carbon atoms, preferably an alkylene radical having 1 to 6 carbon atoms, and n is 0, 1, 2, 3 or 4, preferably 0 or 1.

Surprisingly it has been found that pendantly amino-functionalized organopolysiloxanes bridged with oxalamidoester-terminated polyethers, and also aqueous dispersions of such organopolysiloxanes, can be used as active ingredients in compositions for the care and cleaning of fibrous substrates, more particularly textiles, with the fibrous substrates, more particularly textiles, treated therewith exhibiting significantly improved properties, especially good hydrophilicity properties.

The aqueous dispersions of precrosslinked organopolysiloxanes of the invention preferably form elastomeric films after removal of the water.

The precrosslinked organopolysiloxanes of the invention are preferably hydrophilic.

The precrosslinked organopolysiloxanes (1) of the invention are more particularly those selected from the group of the formulae

(IVa)

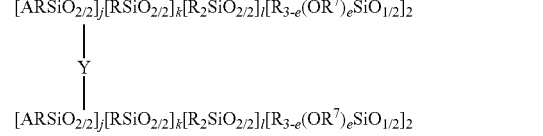

(IVb)

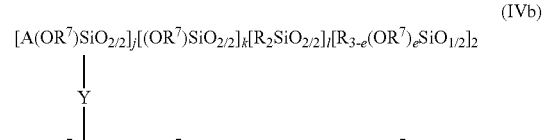

and mixtures thereof, where

R, $R^7$, A and Y have the meaning indicated for them above, e is 0 or 1, j is 0 or an integer between 1 and 15, k is at least 1, preferably at least 2, and at most 15, preferably at most 10, more preferably at most 7, and l is at least 40, preferably at least 65, more preferably at least 110, and at most 1000, preferably at most 800, more preferably at most 500.

The precrosslinked organopolysiloxanes (1) of the invention may optionally also include small amounts of structural units T ($RSiO_{3/2}$) or Q ($SiO_{4/2}$).

In the context of this invention, formula (IVa) or (IVb), respectively, is to be understood to mean that j units [$ARSiO_{2/2}$] or j units [$A(OR^7)SiO_{2/2}$] and k units [$RSiO_{2/2}$—Y—[$RSiO_{2/2}$] or k units [$(OR^7)SiO_{2/2}$]—Y—[$(OR^7)SiO_{2/2}$] and l units [$R_2SiO_{2/2}$], respectively may be distributed in the organopolysiloxane molecule in any desired way—for example, in block form or randomly.

It is possible to use one kind of crosslinked organopolysiloxanes (1) of the invention, or mixtures of two or more kinds.

A further subject of the invention is a process for producing the aqueous dispersions of precrosslinked organopolysiloxanes (1), characterized in that organopolysiloxanes (4) which comprise units of the formula

and on average at least one structural unit of the formula

where

R, $R^1$, and A have the meaning indicated for them above, are reacted with oxalamidoester-terminated polyethers (5) of the formula (V)

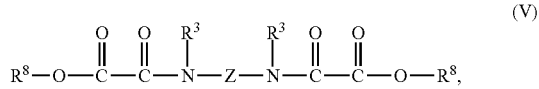

where

Z and $R^3$ have the meaning indicated for them above and $R^8$ is identical or different and is a monovalent hydrocarbon radical which has 1 to 18 carbon atoms and may be interrupted by one or more separate oxygen atoms, in the presence of emulsifiers (2) and water (3).

The nature and amount of organopolysiloxane (4) and oxalamidoester-terminated polyether (5) here are selected such that the organopolysiloxanes (1) in the dispersions obtained are crosslinked.

The dispersions of the invention therefore preferably contain no catalysts.

The dispersions of the invention therefore contain already precrosslinked, preferably hydrophilic, organopolysiloxanes, which following removal of the water crosslink further and preferably form elastomeric films, with the crosslinked, preferably hydrophilic organopolysiloxanes having high molecular mass branched structures.

The dispersions of the invention are preferably aqueous suspensions or aqueous emulsions of precrosslinked organopolysiloxanes.

On drying, without addition of catalyst or modification of pH, the dispersions of the invention develop a silicone network, preferably an elastic silicone network.

As well as the precrosslinked organopolysiloxanes (1), emulsifiers (2) and water (3), the aqueous dispersions of the invention may optionally comprise further ingredients, which do not participate directly in the reaction, such as (6) nonaqueous solvents or coemulsifiers, and (7) auxiliaries, examples being pH regulators, salts, foam inhibitors, thickeners and/or protective colloids, preservatives, disinfectants, wetting agents, corrosion inhibitors, dyes, fragrances or mixtures thereof.

Examples of hydrocarbon radicals R are alkyl radicals, such as the methyl, ethyl, n-propyl, isopropyl, 1-n-butyl, 2-n-butyl, isobutyl, tert-butyl, n-pentyl, isopentyl, neopentyl, tert-pentyl radical, hexyl radicals, such as the n-hexyl radical, heptyl radicals, such as the n-heptyl radical, octyl radicals, such as the n-octyl radical and isooctyl radicals, such as the 2,2,4-trimethylpentyl radical, nonyl radicals, such as the n-nonyl radical, decyl radicals, such as the n-decyl radical, dodecyl radicals, such as the n-dodecyl radical, and octadecyl radicals, such as the n-octadecyl radical, cycloalkyl radicals, such as cyclopentyl, cyclohexyl, cycloheptyl and methylcyclohexyl radicals, alkenyl radicals, such as the vinyl, 5-hexenyl, cyclohexenyl, 1-propenyl, allyl, 3-butenyl and 4-pentenyl radical, aryl radicals, such as the phenyl, naphthyl, anthryl and phenanthryl radical, alkaryl radicals, such as o-, m-, p-tolyl radicals; xylyl radicals and ethylphenyl radicals, and aralkyl radicals, such as the benzyl radical, the alpha- and the beta-phenylethyl radical or the 2-phenylpropyl radical.

Preferred as radicals R are the methyl, ethyl, octyl and phenyl radical; particularly preferred are the methyl and ethyl radical.

Examples of substituted radicals R are haloalkyl radicals, such as the 3,3,3-trifluoro-n-propyl radical, the 2,2,2',2',2'-hexafluoroisopropyl radical, the heptafluoroisopropyl radical, and haloaryl radicals, such as the o-, m- and p-chlorophenyl radical.

Examples of radical $R^1$ are the alkyl radicals listed above for R, and also the hydroxyl, the methoxy, the ethoxy and the hexoxyethyl radical, with the radical $R^1$ preferably comprising the methyl, the ethyl and also the hydroxyl, the methoxy and ethoxy radical.

The radical A is a monovalent radical of the formula

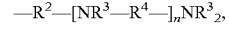

which contains at least one basic amino group.

Examples of $R^2$ are divalent radicals such as the methylene group, the 1,2-ethylene group, the 1,3-propylene group, the 1,3-butylene group, the 1,4-butylene group, the 1,5-pentylene group and the 1,6-hexylene group.

Particularly preferred examples are the 1,3-propylene group and the 1,3-butylene group.

Examples of $R^4$ are divalent radicals such as the 1,2-ethylene group, the 1,3-propylene group, the 1,3-butylene group, the 1,4-butylene group, the 1,5-pentylene group and the 1,6-hexylene group.

A particularly preferred example is the 1,2-ethylene group.

Preferably $R^3$ is a hydrogen atom, an alkyl radical having 1 to 8 carbon atoms, or the acetyl group.

Examples of alkyl radicals $R^3$ are the methyl, ethyl, n-propyl-, isopropyl, 1-n-butyl, 2-n-butyl, isobutyl, tert-butyl, n-pentyl, isopentyl, neopentyl, tert-pentyl radical, hexyl radicals, such as the n-hexyl and the isohexyl radical. Preferred examples of radicals $R^3$ are the hydrogen atom or the methyl radical; particularly preferred is the hydrogen atom.

Examples of the Radical A are

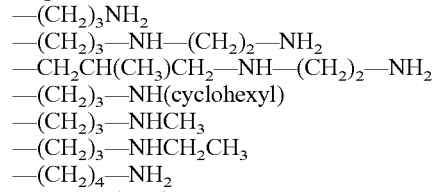

Examples of the Radical Y are

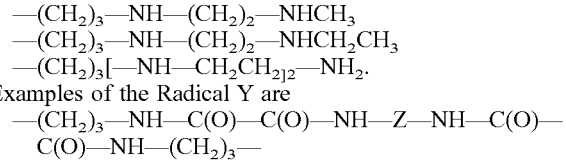

—(CH$_2$)$_3$—NH—(CH$_2$)$_2$—NH—C(O)—C(O)—NH—Z—NH—C(O)—C(O)—NH—(CH$_2$)$_2$—NH—(CH$_2$)$_3$—

—CH$_2$CH(CH$_3$)CH$_2$—NH—(CH$_2$)$_2$—NH—C(O)—C(O)—NH—Z—NH—C(O)—C(O)—NH—(CH$_2$)$_2$—NH—CH$_2$CH(CH$_3$)CH$_2$—

—(CH$_2$)$_3$—N(cyclohexyl)-C(O)—C(O)—NH—Z—NH—C(O)—C(O)—N(cyclohexyl)-(CH$_2$)$_3$—

—(CH$_2$)$_3$—NCH$_3$—C(O)—C(O)—NH—Z—NH—C(O)—C(O)—NCH$_3$—(CH$_2$)$_3$—

—(CH$_2$)$_3$—N(CH$_2$CH$_3$)—C(O)—C(O)—NH—Z—NH—C(O)—C(O)—N(CH$_2$CH$_3$)—(CH$_2$)$_3$—

—(CH$_2$)$_4$—NH—C(O)—C(O)—NH—Z—NH—C(O)—C(O)—NH—(CH$_2$)$_4$—

—CH$_2$CH(CH$_3$)CH$_2$—NH—C(O)—C(O)—NH—Z—NH—C(O)—C(O)—NH—CH$_2$CH(CH$_3$)CH$_2$—

—(CH$_2$)$_3$—NH—(CH$_2$)$_2$—NCH$_3$—C(O)—C(O)—NH—Z—NH—C(O)—C(O)—NCH$_3$—(CH$_2$)$_2$—NH—(CH$_2$)$_3$—

—(CH$_2$)$_3$—NH—(CH$_2$)$_2$—N(CH$_2$CH$_3$)—C(O)—NH—Z—NH—C(O)—C(O)—N(CH$_2$CH$_3$)—NH—(CH$_2$)$_3$—

—(CH$_2$)$_3$[—NH—CH$_2$CH$_2$]$_2$—NH—C(O)—C(O)—NH—Z—NH—C(O)—C(O)—NH—[CH$_2$CH$_2$—NH—]$_2$(CH$_2$)$_3$—, where Z has the meaning indicated for it above.

Examples of the radical Z are divalent hydrocarbonoxy radicals, such as the polyethylene glycol radicals or polypropylene glycol radicals, or mixtures of polyethylene glycol and polypropylene glycol radicals. The radical Z preferably has a molecular weight (Mn, number average) of 50 g/mol to 4500 g/mol, very preferably a molecular weight of 75 g/mol to 2500 g/mol.

Examples of the Radical Z are

—CH$_2$—CH$_2$—O)$_m$—CH$_2$—CH$_2$—

—(CH(CH$_3$)—CH$_2$—O)$_m$—CH$_2$—CH(CH$_3$)—

—(CH(CH$_3$)—CH$_2$—O)$_x$—(CH$_2$—CH$_2$—O)$_y$—(CH(CH$_3$)—CH$_2$—O)$_z$—CH$_2$—CH(CH$_3$)— where m is on average 1 to 80, preferably 2 to 50, and x, y and z are each 0 or an integer, with the proviso that the sum x+y+z is on average 2 to 80, preferably 3 to 50.

Preferred Examples of the Radical z are

—(CH$_2$—CH$_2$—O)$_2$—CH$_2$—CH$_2$—

—(CH(CH$_3$)—CH$_2$—O)$_{about\ 2.5}$—CH$_2$—CH(CH$_3$)—

—(CH(CH$_3$)—CH$_2$—O)$_{about\ 6.1}$—CH$_2$—CH(CH$_3$)—

—(CH(CH$_3$)—CH$_2$—O)$_{about\ 33}$—CH$_2$—CH(CH$_3$)—

—(CH(CH$_3$)—CH$_2$—O)$_{about\ 0.6}$—(CH$_2$—CH$_2$—O)$_2$—(CH(CH$_3$)—CH$_2$—O)$_{about\ 0.6}$—CH$_2$—CH(CH$_3$)—

—(CH(CH$_3$)—CH$_2$—O)$_{about\ 1.8}$—(CH$_2$—CH$_2$—O)$_9$—(CH(CH$_3$)—CH$_2$—O)$_{about\ 1.8}$—CH$_2$—CH(CH$_3$)—

—(CH(CH$_3$)—CH$_2$—)$_{about\ 3}$—(CH$_2$—CH$_2$—O)$_{about\ 12.6}$—(CH(CH$_3$)—CH$_2$—)$_{about\ 3}$—CH$_2$—CH(CH$_3$)—

—(CH(CH$_3$)CH$_2$—O)$_{about\ 3}$—(CH$_2$—CH$_2$—O)$_{about\ 39}$—(CH(CH$_3$)CH$_2$—O)$_{about\ 3}$—CH$_2$—CH(CH$_3$)—

Emulsifiers (2) used for the dispersions of the invention may be all emulsifiers known to the skilled person for producing silicone emulsions, such as, for example, nonionic, anionic, cationic or amphoteric emulsifiers; the emulsifiers (2) may be used both individually and as mixtures of different emulsifiers.

(Nonlimiting) Examples of Nonionic Emulsifiers Used are as Follows:

1. Alkyl polyglycol ethers, preferably those having 3 to 40 EO units and alkyl radicals of 8 to 20 carbon atoms.
2. Carboxylic acid polyglycol esters, more particularly fatty acid polyglycol esters, preferably those having more than 6 EO units and carboxylic acid radicals of 8 to 20 carbon atoms.
3. Ethoxylated or nonethoxylated sorbitan fatty acid esters.
4. Ethoxylated castor oil or hydrogenated variants.
5. Polyglycerol carboxylic acid esters.
6. Alkylpolyglycosides of the formula R*—O-G$_o$, in which R* is a linear or branched, saturated or unsaturated alkyl radical having on average 8-24 carbon atoms and G$_o$ is an oligoglycoside radical having on average o=1-10 hexose or pentose units or mixtures thereof.
7. Alkylaryl polyglycol ethers, preferably those having 5 to 30 EO units and 8 to 20 carbon atoms in the alkyl and aryl radicals.
8. Ethylene oxide/propylene oxide (EO/PO) block copolymers, preferably those having 8 to 40 EO and PO units.
9. Polyvinyl alcohol also having 5 to 50 mol %, preferably 8 to 20 mol %, of vinyl acetate units, with a degree of polymerization of 500 to 3000.
10. Adducts of alkylamines having alkyl radicals of 8 to 22 carbon atoms with ethylene oxide or propylene oxide.
11. Natural substances and their derivatives, such as lecithin, lanolin, saponins, cellulose; cellulose alkyl ethers and carboxyalkylcelluloses whose alkyl groups each possess up to 4 carbon atoms.
12. Linear organo(poly)siloxanes containing polar groups, containing in particular the elements O, N, C, S, P, Si, more particularly those organo(poly)siloxanes having alkoxy groups having up to 24 carbon atoms and/or up to 40 EO and/or PO groups.
13. Fatty acids having up to 6 to 24 carbon atoms.

Preferred Nonionic Emulsifiers are

1. Alkyl polyglycol ethers, preferably those having 3 to 30 EO units and alkyl radicals of 8 to 20 carbon atoms such as, for example, Ceteareth-20, Oleth-10, Oleth-20, Laureth-3, Laureth-4, Laureth-20, Laureth-23, Trideceth-5, Trideceth-6, Trideceth-8, Trideceth-10, Trideceth-12, Trideceth-16, Trideceth-20, Steareth-20 or Steareth-21 (according to INCI designation).
2. Carboxylic acid polyglycol esters, more particularly fatty acid polyglycol esters, preferably those having more than 6 EO units and carboxylic acid radicals of 8 to 20 carbon atoms, such as, for example, PEG-20 Laurate, PEG-7 Olivate, PEG-8 Oleate, PEG-8 Laurate, PEG-4 Stearate, PEG-6 Stearate, PEG-20-Stearate or PEG-100 Stearate (according to INCI designation).
3. Ethoxylated or nonethoxylated sorbitan fatty acid esters, such as, for example, Sorbitan Laurate, Polysorbate 20, Polysorbate 60, Polysorbate 80 or Polysorbate 85 (according to INCI designation).
4. Ethoxylated castor oil or hydrogenated variants, such as, for example, (designated according to INCI nomenclature) PEG 200 Castor Oil or PEG-60 hydrogenated Castor Oil.
5. Polyglycerol carboxylic acid esters, such as, for example, polyglycerol-10 oleate, polyglycerol-10 laurate or polyglycerol 10 stearate.
6. Alkylpolyglycosides of the formula R*—O-G$_o$, in which R* is a linear or branched, saturated or unsaturated alkyl radical having on average 8-24 carbon atoms and G$_o$ is an oligoglycoside radical having on average o=1-10 hexose or pentose units or mixtures thereof, such as, for example, Glucopon 215, Glucopon 225, Glucopon 600 (designation according to trade names).

(Nonlimiting) Examples of Anionic Emulsifiers are as Follows:
1. Alkyl sulfates, particularly those having a chain length of 8 to 18 carbon atoms, alkyl and alkaryl ether sulfates having 8 to 18 carbon atoms in the hydrophobic radical and 1 to 40 ethylene oxide (EO) and/or propylene oxide (PO) units.
2. Sulfonates, particularly alkylsulfonates having 8 to 18 carbon atoms, alkylarylsulfonates having 8 to 18 carbon atoms, taurides, esters and monoesters of sulfosuccinic acid with monohydric alcohols or alkylphenols having 4 to 15 carbon atoms; these alcohols or alkylphenols may optionally also be ethoxylated with 1 to 40 EO units.
3. Alkali metal and ammonium salts of carboxylic acids having 8 to 20 carbon atoms in the alkyl, aryl, alkaryl or aralkyl radical, more particularly alkali metal and ammonium salts of fatty acids, preferably those having carboxylic acid radicals of 8 to 20 carbon atoms.
4. Phosphoric acid partial esters and their alkali metal and ammonium salts, particularly alkyl and alkaryl phosphates having 8 to 20 carbon atoms in the organic radical, alkyl ether phosphates and alkaryl ether phosphates having 8 to 20 carbon atoms in the alkyl or alkaryl radical and 1 to 40 EO units.

Preferred Anionic Emulsifiers are
1. Alkyl sulfates, such as sodium lauryl sulfate, ammonium lauryl sulfate, secondary C13-C18 alkane sulfonate sodium salt, C12-C18 fatty alcohol sulfate sodium salt, alkyl ether sulfates, such as C12-C14 fatty alcohol 2EO-ether sulfate ammonium salt, C12-C14 fatty alcohol 2EO-ether sulfate ammonium salt, alkylaryl ether sulfates, such as secondary C10-C13-n-alkylbenzene sulfonate sodium salt
2. Alkylsulfonates, such as disodium 2-sulfolaurate,
3. Alkali metal and ammonium salts of carboxylic acids having 8 to 20 carbon atoms in the alkyl, aryl, alkaryl or aralkyl radical; particularly preferred anionic emulsifiers are alkali and ammonium salts of fatty acids, preferably those having carboxylic acid radicals of 8 to 20 carbon atoms, such as, for example, sodium salts, potassium salts, triethanolammonium salts of lauric acid, myristic acid, palmitic acid, stearic acid or else oleic acid.
4. Phosphoric acid partial esters, such as C8/C10 fatty alcohol phosphoric acid partial ester sodium salt (Crodaphos 810A) or monoethanol amine salt.

(Nonlimiting) Examples of Cationic Emulsifiers are as Follows:
1. Salts of primary, secondary and tertiary fatty amines having 8 to 24 carbon atoms with acetic acid, sulfuric acid, hydrochloric acid and phosphoric acids.
2. Alkylpyridinium, alkylimidazolinium and alkyloxazolinium salts, more particularly those whose alkyl chain possesses up to 18 carbon atoms, especially the halides, sulfates, phosphates and acetates.
3. Quaternary alkyl ammonium and alkylbenzene ammonium salts, more particularly those whose alkyl groups possess 6 to 24 carbon atoms, more particularly the halides, sulfates, phosphates and acetates.

(Nonlimiting) Examples of Amphoteric Emulsifiers are as Follows:
1. Amino acids with long-chain substitution, such as N-alkyl-di(aminoethyl)glycine or N-alkyl-2-aminopropionic acid salts.
2. Betaines, such as N-(3-acylamidopropyl)-N,N-dimethylammonium salts with a C8-C18 acyl radical, and alkylimidazolium betaines or quaternized alkyl or substituted alkyl derivatives of N,N-dimethylglycine.

Preferred as emulsifiers for the production for aqueous dispersions of precrosslinked hydrophilic organopolysiloxanes are nonioinic emulsifiers, more particularly the above-listed alkyl polyglycol ethers.

Constituent (2) may consist of one of the above-stated emulsifiers or of a mixture of two or more above-stated emulsifiers; it may be used in pure form or as solutions of one or more emulsifiers in water or organic solvents.

Nonaqueous solvents or coemulsifiers (6) may optionally be used as further ingredients in the dispersions of the invention.

The dispersions of the invention comprise nonaqueous solvents or coemulsifiers (6) in an amount of preferably at least 0.1 wt %, more preferably at least 0.4 wt %, more particularly at least 0.8 wt %, and preferably at most 20 wt %, more preferably at most 15 wt %, more particularly at most 10 wt %.

The nonaqueous solvents (6) which may be used in the aqueous dispersions of the invention originate, for example, from the group of mono- or polyhydric alcohols, alkanolamiones or glycol ethers.

Examples of solvents are ethanol, n- or isopropanol, butanols, such as 1-butanol, 2-butanol or 2-methyl-2-propanol, pentanols, such as 1-pentanol, 2-pentanol or 3-pentanol, hexanols, such as 1-hexanol, 2-hexanol or 3-hexanol, heptanols, such as 1-heptanol, 2-heptanol, 3-heptanol or 4-heptanol, octanols, such as 1-octanol, 2-octanol, 3-octanol or 4-octanol, glycol, propanediol, butanediols, such as 1,2-butanediol or 1,3-butanediol, hexanediols, such as 1,2-hexanediol or 2-methylpentane-2,4-diol, octanediols, such as 2-ethylhexane-1,3-diol or 1,2-octanediol, glycerol, diglycol, propyl- or butyldiglycol, ethylene glycol methyl ether, ethylene glycol ethyl ether, ethylene glycol propyl ether, ethylene glycol mono-n-butyl ether, diethylene glycol methyl ether, diethylene glycol ethyl ether, diethylene glycol mono-n-butyl ether, propylene glycol methyl ether, propylene glycol ethyl ether, propylene glycol propyl ether, propylene glycol-b-butyl ether, propylene glycol t-butyl ether, methoxytriglycol, ethoxytriglycol, butoxytriglycol, dipropylene glycol monomethyl ether, dipropylene glycol monoethyl ether, 1-butoxyethoxy-2-propanol or 3-methyl-3-methoxybutanol, 1-aminobutane, 2-aminobutane, 2-amino-2-methylpropane, 1-aminopentane, 2-aminopentane, 1-aminohexane, 1-aminoheptane and 1-aminooctane; ethyl, propyl, isopropyl, butyl, isobutyl, pentyl, isopentyl and hexyl acetate; methyl, ethyl and tert-butyl propionate; methyl, ethyl, propyl and butyl butyrate; 2-butanone, 2-pentanone, 3-pentanone, 4-methyl-2-pentanone, 2-hexanone, 3-hexanone, 2-heptanone, 3-heptanone, 4-heptanone, 5-methyl-3-heptanone, 2-octanone and 3-octanone, and also mixtures of these cosurfactants.

Examples of preferred nonaqueous solvents or co-emulsifiers (6) are 1-alkanols of the above-listed examples having $C_5$ to $C_8$ chains, alkanediols of the above-listed examples having $C_4$ to $C_8$ chain, glycerol, propyl, butyl and pentyl acetate, 2-pentanone, and also the above-listed ethylene glycol, propylene glycol, diproplyene glycol or diethylene glycol monoalkyl ethers.

Particularly preferred as nonaqueous solvents or co-emulsifiers (6) are 1-pentanol, 1-hexanol, 1-octanol, propanediol, 1,3-butanediol, 1,2-hexanediol, 2-ethylhexane-1,3-diol, 1,2-octanediol, glycerol, diethylene glycol methyl ether, diethylene glycol ethyl ether, diethylene glycol mono-n-butyl ether, propylene glycol methyl ether.

A further possibility is to use polyalkylene glycols, such as polyethylene glycols (e.g. PEG600, PEG1000 or PEG6000) or polypropylene glycols (e.g. PPG2000), polyalkylene block polymers, such as the so-called poloxamers (block copolymers of ethylene oxide and propylene oxide units), such as, for example, PEG-PPG-PEG block polymer Pluronic® L-31, PEG-PPG-PEG block polymer Pluronic® L-61, PPG-PEG-PPG block polymer Pluronic® 17R4, PPG-PEG-PPG Pluronic® block polymer 31 R1 (available from Sigma-Aldrich) or else poloxamines (copolymers of ethylene oxide and propylene oxide units bridged via an ethylene diamine core) such as, for example, Tetronic 701 or Tetronic 90R4 (available from Sigma-Aldrich) as co-emulsifiers.

As further ingredients in the dispersions of the invention it is possible optionally to use (7) auxiliaries, such as pH regulators, salts, foam inhibitors, thickeners and/or protective colloids, preservatives, disinfectants, wetting agents, corrosion inhibitors, dyes, fragrances or mixtures thereof.

Employable here as pH regulators are all known acids and alkalis, providing there is no prohibition on their use for reasons of performance or environment or for reasons of consumer protection.

The acids used here serve to establish a desired pH or may form acid addition salts with the amino-containing radicals (A) or else (Y) of the precrosslinked organopolysiloxanes (1).

Examples of mineral acids which may be reacted, for example, with the abovementioned amino-containing radicals (A) or else (Y) are hydrochloric, perchloric, sulfuric, sulfurous, nitric, nitrous, hydrofluoric, phosphoric, diphosphoric and polyphosphoric acids. Examples of suitable carboxylic acids are formic, acetic, propionic, butanoic acids, citric acid, trichloro-, dichloro- and chloroacetic acid, trifluoroacetic acid, cyanoacetic acid, phenylacetic acid, benzoic acid, m- and p-nitrobenzoic acid, oxalic acid, malonic acid and lactic acid.

Particularly preferred are acetic acid, lactic acid and formic acid.

Examples of salts (electrolytes) are, more particularly, those from the group of the inorganic salts, where a broad number of any of a very wide variety of salts may be used. Preferred cations are the alkali and alkaline earth metals; preferred anions are the halides and sulfates. From a production standpoint it is preferable to use sodium acetate or sodium chloride in the aqueous emulsions of the invention.

Examples of foam inhibitors are soaps, paraffins or silicone oils.

Examples of preservatives are methylisothiazolinone, chloromethylisothiazolinone, benzylisothiazolinone, phenoxyethanol, methyl paraben, ethyl paraben, propyl paraben, butyl paraben, isobutyl paraben, alkali metal benzoates, alkali metal sorbates, iodopropynyl butylcarbamate, benzyl alcohol and 2-bromo-2-nitropropane-1,3-diol.

Preference is given to using, in the process of the invention for preparing the precrosslinked organopolysiloxanes (1) and their aqueous dispersions, as organopolysiloxanes (4), those selected from the group of the formulae $$[ARSiO_{2/2}]_j[R_2SiO_{2/2}]_l[R_{3-e}(OR^7)_eSiO_{1/2}]_2 \quad (VIa),$$

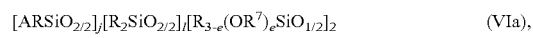

$$[A(OR^1)SiO_{2/2}]_j[R_2SiO_{2/2}]_l[R_{3-e}(OR^7)_eSiO_{1/2}]_2 \quad (VIb)$$

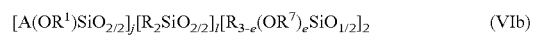

and mixtures thereof, where A, R, $R^1$ and $R^7$ and also j, l and e have the meaning indicated for them above.

In the production of the dispersions of the invention it is possible to use one kind of oxalamidoester-terminated polyether (5) of the formula (V)

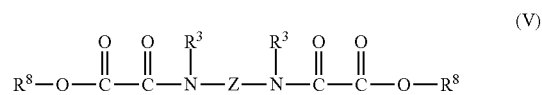

or different kinds of oxalamidoester-terminated polyethers (5) of the formula (V), where $R^3$, $R^8$ and Z have the meaning indicated above.

Examples of oxalamidoester-terminated polyether (5) are

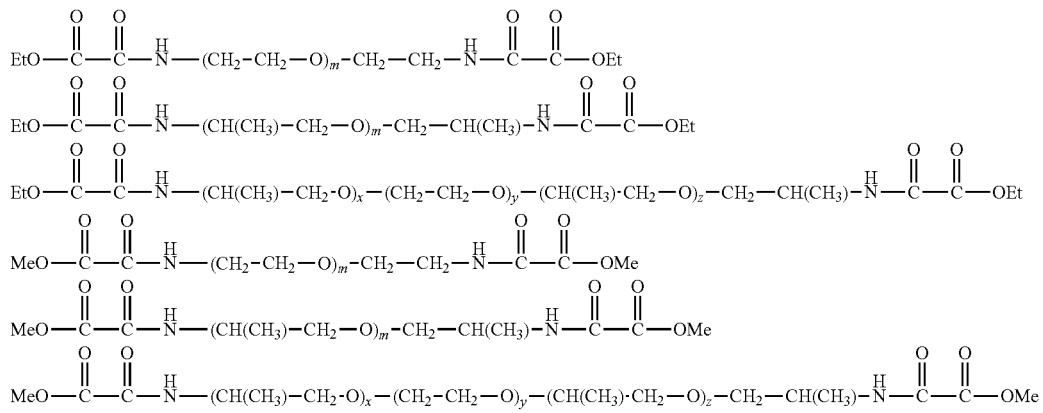

where m is on average 1 to 80, preferably 2 to 50, and x, y and z are each 0 or an integer, with the proviso that the sum x+y+z is on average 2 to 80, preferably 3 to 50.

Preferred examples of oxalamidoester-terminated polyethers (5) are

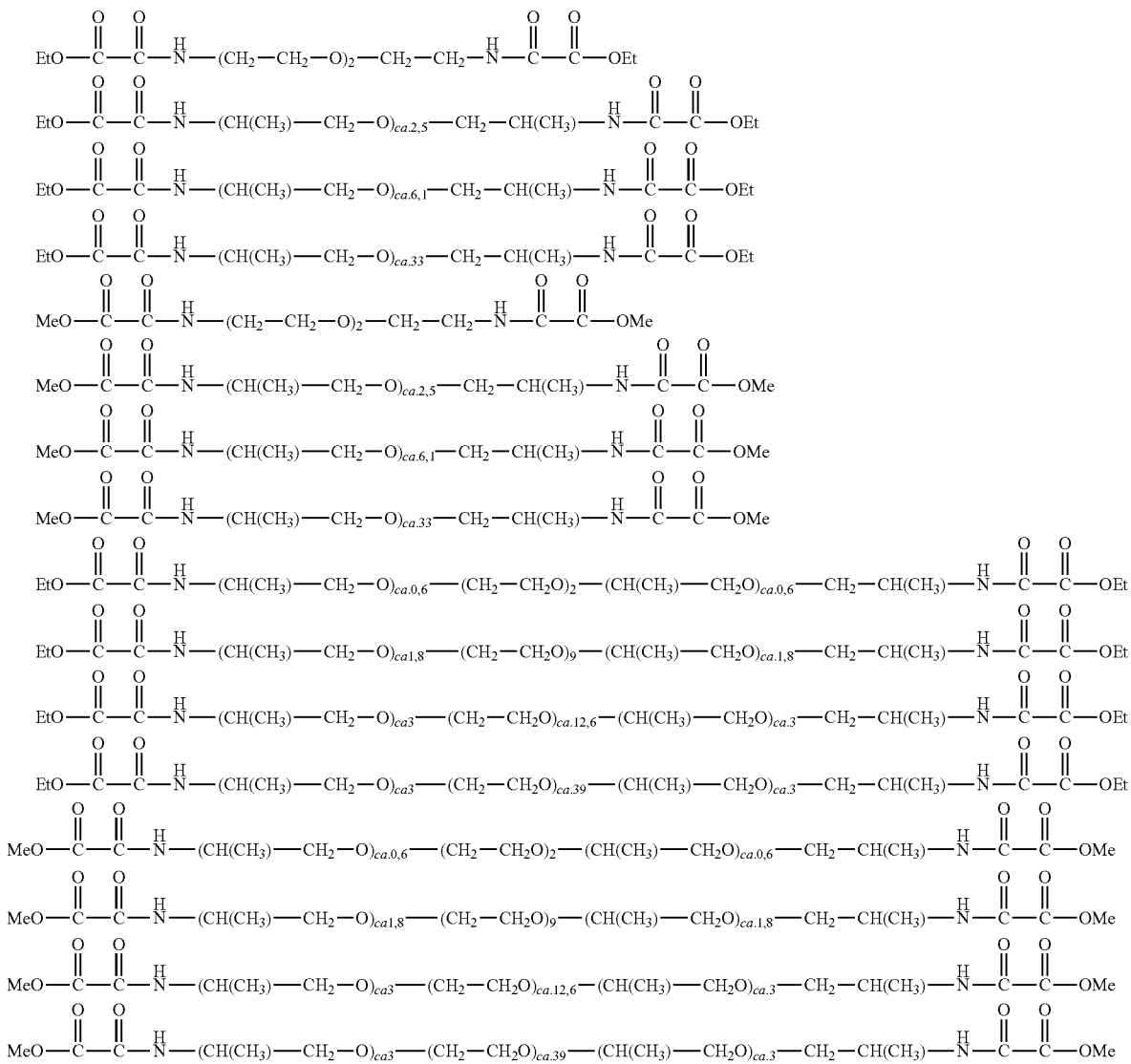

In the process of the invention for preparing the precrosslinked organopolysiloxanes (1) and producing aqueous dispersions thereof, oxalamidoester-terminated polyethers (5) are used in amounts of preferably at least 0.1 mol, more preferably at least 0.15 mol, and preferably at most 1 mol, more preferably at most 0.75 mol, per mole of amine group in the organopolysiloxanes (4).

Oxalamidoester-terminated polyethers (5) are known and have been described for example in N. Fukada, Bull. Chem. Soc. Jpn., 69, 1397-1401 (1996). The oxalamidoester-terminated polyethers (5) there were isolated in traces as a byproduct following chromatographic separation.

Oxalamidoester-terminated polyethers (5) may be prepared specifically from amino-terminated polyethers through use of oxalic diesters, such as oxalic diethyl ester, for example, if the oxalic diester is used in a stoichiometric excess and the excess is subsequently removed by distillation. Oxalic diesters in this case are used in an excess of preferably 2-20-fold molar excess, more preferably 2-10-fold molar excess.

Oxalamidoester-terminated polyethers (5) are therefore prepared preferably by reacting amino-terminated polyethers with oxalic diesters of the formula

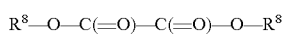

where $R^3$, $R^8$ and Z have the meaning indicated for them above, with the proviso that oxalic diesters are used in amounts of preferably 2 to 20 mol, more preferably 2 to 10 mol, of oxalic diester per mole of amino-terminated polyether.

The dispersions of the invention of precrosslinked organopolysiloxanes (1) are produced by intense mixing of organopolysiloxanes (4) with oxalamidoester-terminated polyether (5),
water (3),
emulsifiers (2),
optionally nonaqueous solvents or co-emulsifiers (6), and
optionally auxiliaries (7)
with one another.

The dispersions of the invention are produced using preferably at least 5 wt %, more preferably at least 10 wt %, and preferably at most 60.0 wt %, more preferably at most 45 wt %, very preferably at most 35 wt %, of organopolysiloxanes (4), based in each case on the total weight of the dispersion.

The nature of the mixing of the components needed to produce dispersions of the invention is not very critical and it may be practiced in a variety of orders. Depending on components (2), (3), (4), (5), optionally (6) and optionally (7), however, there may be preferred procedures, which should be examined on a case-by-case basis.

It is possible, for example, to premix components (4) and (5) with one another, before the emulsifier or emulsifiers (2) and optionally component (6) are added and thereafter water (3) and optionally components (7) are incorporated. It is also possible for components (2) to (7) to be metered in order into the emulsifying apparatus. In particular cases it may be advantageous, owing to the siloxane viscosity or siloxane reactivity, for example, to mix oxalamidoester-terminated polyether (5) with an organopolysiloxane (4) and thereafter to incorporate a different organopolysiloxane (4), or vice versa, according to how more favorable rheological properties are produced for the processing of the components.

It is also possible, furthermore, to add oxalamidoester-terminated polyethers (5) to the completed emulsion of organopolysiloxanes (4), so as to achieve the desired reaction and crosslinking of the organopolysiloxanes (4) in the emulsion, with formation of the dispersion of the invention of crosslinked organopolysiloxanes (1).

The alcohols $R^8OH$ obtained when producing the dispersions, as byproducts of condensation, where $R^8$ has the meaning indicated for it above, may remain in the product or else be removed, as for example by vacuum distillation, membrane techniques, or by extraction.

The emulsifying procedure for producing the aqueous emulsions of the invention of crosslinked organopolysiloxanes (1) is carried out preferably at temperatures of at least 10° C., more preferably at least 15° C., and preferably at most 80° C., more preferably at most 70° C.

The temperature increase comes about preferably through the introduction of mechanical shearing energy which is needed for the emulsifying operation. The temperature increase is not needed for the purpose of accelerating a chemical process, more particularly the crosslinking. Furthermore, the process of the invention is carried out preferably under the pressure of the surrounding atmosphere, though may also be carried out at higher or lower pressures.

Production may take place batchwise or continuously.

Technologies for the production of emulsions of organopolysiloxanes are known. Hence the intense mixing and dispersing may take place in rotor-stator stirring apparatuses, colloid mills, high-pressure homogenizers, microchannels, membranes, jet nozzles and the like, or by means of ultrasound. Homogenizing devices and techniques are described for example in Ullmann's Encyclopedia of Industrial Chemistry, CD-ROM edition 2011, Wiley-VCH Verlag, under the head word "Emulsions".

The mean particle size measured by light scattering in the dispersions of the invention is preferably in the 0.001 to 50 μm range, more preferably at 0.005 to 10 μm, very preferably in the 0.01 to 5 μm range. The pH values may vary from 1 to 14, preferably 3 to 9, more preferably 4 to 8.

The precrosslinked organopolysiloxanes (1) of the invention or aqueous dispersions thereof find use as active ingredients in products for treating substrates, preferably fibrous substrates, more preferably textiles, especially in compositions for the care and cleaning of substrates, preferably fibrous substrates, more preferably textiles.

A subject of the invention are compositions for treating substrates, preferably fibrous substrates, more particularly textiles, comprising aqueous dispersions of the invention of precrosslinked organopolysiloxanes (1), or precrosslinked organopolysiloxanes (1) of the invention.

A further subject of the invention is therefore the use of the precrosslinked organopolysiloxanes (1) of the invention or aqueous dispersions thereof in compositions for treating substrates, preferably fibrous substrates, more preferably textiles, especially in compositions for the care and cleaning of substrates, preferably fibrous substrates, more preferably textiles.

The term "active ingredient" here refers to a substance which fulfills the purpose of (a) providing care for an article, in other words maintaining an article in its original form, reducing or preventing the effects of external influences (e.g. time, light, temperature, pressure, soiling, chemical reaction with other reactive compounds that come into contact with the article) such as, for example, ageing, soiling, material fatigue, bleaching, or even improving desired positive properties of the article.

Examples in the case of textile fibers and fabrics are the attainment of a significantly improved softness of the fibers/fabric after washing, reduction in creasing of the fabric during the rinsing and drying stages, reduction in the occurrence of folds or creases prior to ironing, reduction in the force needed to iron the fabric, protection from creasing in the course of use, retention of the shape of the textile fabric during washing, care and use, improvement in the wettability of the fibers/fabrics, reduction of the pilling effect (i.e., of formation of pills or fuzz) in textile fabrics, suppression of the effect of dry rigidity that occurs in drying laundry, attainment of greater elasticity in fibers/fabrics, attainment of improved gloss in fibers, or reduction in fading of the colors in fibers/fabrics.

The term "active ingredient" is additionally understood to refer to a substance which fulfills the purpose of (b) cleaning an article, in other words removing or supporting the removal of impurities resulting from the use of the article.

In this context, products, more particularly compositions, for the care and cleaning are understood to include the following formulations or compositions:

Formulations which are used in household and industry for the care and cleaning of surfaces, such as, for example, fibers, leather, cloth, wood, glass, ceramic, tiles, linoleum, and plastics.

Examples of products for the cleaning and care of such surfaces are laundry detergents (heavy-duty laundry detergents, color laundry detergents, fabric softeners, etc.), dishwashing detergents, machine-dishwashing detergents, rinse aids, neutral cleaners, window-cleaning products, all-purpose cleaners, glass cleaners, sanitary cleaners, toilet cleaners, carpet cleaners, and car care products.

The aqueous dispersions of the invention are used in these compositions preferably in amounts of 0.1 to 40 wt %, more preferably of 0.2 to 30 wt %, very preferably 0.4 to 20 wt %, based in each case on the total weight of the compositions.

The composition in which the aqueous dispersions of the invention are used may take the form of a W/O emulsion (water-in-oil emulsion), an O/W emulsion (oil-in-water emulsion) or a multiple emulsion.

The medium preferred in the compositions is water.

These preferred compositions generally comprise emulsions, in which one phase of finely dispersed droplets, surrounded by a shell of emulsifier, is present in a second phase (water droplets in W/O emulsions or lipid vesicles in O/W emulsions).

"Microemulsions" have droplet diameters in the range from about 0.01 µm to about 0.1 µm. In the case of "macroemulsions" there are droplet diameters in the range from around 0.1 µm to around 50 µm.

Such "macroemulsions", without further coloring additions, are milky white in color and opaque. Finer "macroemulsions", with droplet diameters in the range from around 0.1 µm to around 1 µm, again without coloring additions, are blueish white in color and nontransparent.

"Microemulsions" are transparent or translucent emulsions.

A clear and transparent appearance is the preserve of micellar and molecular solutions having particle diameters of less than around 0.01 µm.

In the examples which follow, all statements of parts and percentages, unless otherwise indicated, are based on the weight.

Unless otherwise stated, the examples which follow are carried out at a pressure of the surrounding atmosphere, in other words at about 1000 hPa, and at room temperature, in other words about 20° C., or at a temperature which comes about when the reactants are combined at room temperature without additional heating or cooling.

For the statements of the HLB values, the HLB values reported by the respective manufacturers were employed. Given that emulsifiers, such as the polyethers, for example, are mostly oligomers/polymers with a molecular weight distribution, this distribution may be different from one manufacturer to another. Hence it is also possible for different statements of the corresponding HLB to be made from manufacturer to manufacturer, and this may also differ from the theoretical HLB for the particular chemical name specified.

Dynamic viscosities were measured on an "MCR 302" rheometer from Anton Paar in accordance with DIN EN ISO 3219: 1994 and DIN 53019, using a cone-plate system (CP50-2 cone) with an opening angle of 2°. The instrument was calibrated with 10000 standard oil from the Physikalisch-Technische Bundesanstalt [German National Metrology Institute]. The measurement temperature is 25.00° C.+/−0.05° C., the measurement time 3 min. The viscosity figure (recorded in mPa·s) represents the arithmetic mean of three independently conducted individual measurements. The measurement uncertainty of the dynamic viscosity is 1.5%. The shear rate gradient was chosen depending on the viscosity and is identified separately for each viscosity figure.

Kinematic viscosities are determined using a Schott ViscoSystem® AVS 350 viscosity measurement system and using Ubbelohde viscometer tubes with constant (e.g., from Windaus or from VWR) in accordance with DIN 51562-Part 1 or ISO/DIS 3105 (including their calibration). The measurements take place at a temperature of 25.0° C. (+− 0.1° C.). The viscosity figure (reported in mm$^2$/s) represents the arithmetic mean of three independently conducted individual measurements: the measurement uncertainty of the kinematic viscosity is 1.05%. Depending on the measurement range, different viscometer tubes with corresponding directional constants are used:

| Measurement range | Capillary No. | Directional constant |
|---|---|---|
| 0.5-3 mm$^2$/s | 0c | 0.003K |
| 0.8-5 mm$^2$/s | 0a | 0.005K |
| 1.2-10 mm$^2$/s | I | 0.01K |
| 3-30 mm$^2$/s | Ic | 0.03K |
| 10-100 mm$^2$/s | II | 0.10K |
| 30-300 mm$^2$/s | IIc | 0.30K |
| 100-1000 mm$^2$/s | III | 1K |
| 300-3000 mm$^2$/s | IIIc | 3K |
| 1000-10 000 mm$^2$/s | IV | 10K |

Reporting of the measurement range, of the corresponding capillary number and of the constant as per VWR-Laborkatalog, 2011-2013, p. 645.8.

The amine number indicates the number of mmol of KOH that are equivalent to one gram of the substance under determination. The amine number is determined in accordance with DIN 16945-Version 1989-03.

$^1$H-NMR spectra are recorded as a solution in CDCl$_3$ on a Bruker Avance 500 NMR spectrometer (5 mm selective 1H-NMR sample head) with a 500.13 MHz measurement frequency.

Evaluation takes place in the manner known to the skilled person and described in the following references: "Über die $^1$H—, $^{13}$C- and $^{29}$Si-NMR chemischen Verschiebungen einiger linearer, verzweigter und cyclischer Methyl-Siloxan-Verbindungen" [On the $^1$H—, $^{13}$C- and $^{29}$Si NMR chemical shifts of certain linear, branched and cyclic methyl-siloxane compounds], G. Engelhardt, H. Jancke; J. Organometal. Chem. 28 (1971), 293-300; "Chapter 8-NMR spectroscopy of organosilicon compounds", Elizabeth A. Williams, The Chemistry of Organic Silicon Compounds, 1989 John Wiley and Sons Ltd, 511-533.

The particle sizes are determined on a Zetasizer Nano-S particle size measuring instrument from Malvern, Software Version 6.01, by means of dynamic light scattering (Mie measurement method). For this the dispersions are diluted with filtered and degassed water to 0.5 wt %. The reported values always refer to the D(50) value. D(50) is understood to be the volume-average particle diameter for which 50% of all the measured particles have a volume-average diameter less than the identified value of the D(50). The measurements are made at 25° C. with the following established settings: refractive index of water (Dispersant RI) at 1.330; viscosity (cP) at 0.8872; refractive index of the disperse phase (Material RI) at 1.39; material absorption at 0.010; measurement duration (Duration Used) at 50 s; Measurement Position at 0.65 mm. The photon count rates reported in the dispersion examples are obtained from the respective degree of dilution of the samples, and are therefore different. All that is important is that the measuring program releases the results with the note 'Result Quality: Good'.

Example 1: Oxalamidoester-Terminated Polyether A

In a 1 l round-bottom flask, 200 g of α,ω-diamino-terminated polyether, purchasable under the trade name Jeffamine® ED-600 (from Huntsman Corporation), are devolatilized, for the removal of water traces and volatile constituents, for 2 h on a rotary evaporator with oil heating bath under a reduced pressure of 0.1 mbar and at 100° C. heating bath temperature. The dewatered Jeffamine® ED-600 possesses an amine number of 3.3 meq/g (MG=606 g/mol). 243 g of diethyl oxalate (1.66 mol) from Sigma-Aldrich (St. Louis, Missouri/USA) are admixed slowly dropwise, under $N_2$ protective gas and with intense stirring, with 100 g of the dewatered Jeffamine ED-600 (0.33 mol of $NH_2$), so that the reaction mixture does not heat up above 50° C. This is followed by further stirring at room temperature for 1 h. The excess diethyl oxalate is distilled off subsequently on a rotary evaporator under reduced pressure (1 mbar) at a bath temperature of 90° C. This gives 222.3 g of a clear yellowish liquid.

Example 2: Oxalamidoester-Terminated Polyether B 883 g of diethyl oxalate (6.04 mol) from Sigma-Aldrich (St. Louis, Missouri/USA) are admixed slowly dropwise, under $N_2$ protective gas and with intense stirring, with 100 g (1.14 mol of $NH_2$) of 3,3'-ethylenedioxybis(propylamine) (MW=176 g/mol), purchasable under the tradename Jeffamine® EDR-176 (from Huntsman Corporation), so that the reaction mixture does not heat up above 50° C. This is followed by further stirring at room temperature for 1 h. The excess diethyl oxalate is distilled off subsequently on a rotary evaporator under reduced pressure (1 mbar) at a bath temperature of 90° C. This gives a clear light-brown liquid.

Example 3: Oxalamidoester-Terminated Polyether C

In a 1 l round-bottom flask, 250 g of α,ω-diamino-terminated polyether, purchasable under the trade name Jeffamine® D-2000 (from Huntsman Corporation), are devolatilized, for the removal of water traces and volatile constituents, for 2 h on a rotary evaporator with oil heating bath under a reduced pressure of 0.1 mbar and at 100° C. heating bath temperature. The dewatered Jeffamine® D-2000 possesses an amine number of 1.015 meq/g (MG=1970 g/mol).

296.66 g of diethyl oxalate (2.03 mol) from Sigma-Aldrich (St. Louis, Missouri/USA) are admixed slowly dropwise, under $N_2$ protective gas and with intense stirring, with 200 g (0.20 mol of $NH_2$) of dewatered Jeffamine® D-2000, so that the reaction mixture does not heat up above 50° C. This is followed by further stirring at room temperature for 1 h. The excess diethyl oxalate is distilled off subsequently on a rotary evaporator under reduced pressure (1 mbar) at a bath temperature of 90° C. This gives a clear light-brown liquid.

(Comparative) Example 4: Emulsion Ce1 of an Amino-Functionalized Polydimethylsiloxane (Noninventive)

An Ultra-Turrax T 50 emulsifier (from Janke & Kunkel/IKA) at 5000 rpm is used to premix 1.6 g of an 80% aqueous solution of isotridecyl decaethoxylate, purchasable under the trade name Lutensol TO 10 (from BASF), 5.8 g of isotridecyl pentaethoxylate, purchasable under the trade name Lutensol TO 5 (from BASF), 2.5 g of fully demineralized water and 0.3 g of 80% acetic acid. This premix is admixed in four portions with 14.8 g of a hydroxy/methoxy-terminated copolymer, conditioned at 40° C., composed of 3-(2-aminoethylamino)propylmethylsiloxy units and dimethylsiloxy units, having an amine number of 0.30 mequ/g and a viscosity of 800-1800 $mm^2/s$ (25.0° C.; capillary number IIIc), with each portion being incorporated and homogenized in 2 minutes with shearing at 5000 rpm. Slow dilution is carried out with 70.0 g of fully demineralized water in portions at 4000 rpm to give the desired emulsion. Addition of 0.9 g of 2-phenoxyethanol, purchasable under the trade name S&M Phenoxyethanol (Schülke and Mayr GmbH and CO KG), and 4.0 g of 86% glycerol is followed by homogenization at 4000 rpm for a further 2 minutes. This gives a transparent to opalescent, colorless microemulsion of low viscosity with a solids content of 27% and a pH of 5.5. The emulsion remains stable and homogeneous even in storage.

(Comparative) Example 5: Emulsion CE2 of an Amino-Functionalized Polydimethylsiloxane (Noninventive)

An LDV 1 dissolver from PC Laborsystem is used to prepare an emulsion CE2 from 6.5 g of isotridecyl pentethoxylate, purchasable under the tradename Lutensol TO 5 (from BASF), 20.0 g of a copolymer of 3-(2-aminoethylamino)propylmethylsiloxy units and dimethylsiloxy units, having an amine number of 0.13 mequ/g and a viscosity of 3900 $mm^2/s$ (25.0° C.; capillary no. IV), 2.9 g of glycerol, 0.12 g of 80% acetic acid, 0.19 g of N-morpholinomethyltriethoxysilane and 70 g of water, this emulsion having a particle size D(50) of 28 nm (at a photon count rate of 286 kcps). Incorporated into this emulsion by mixing is 0.13 g of 2-phenoxyethanol, purchasable under the tradename S&M Phenoxyethanol (Schülke and Mayr GmbH and CO KG).

(Comparative) Example 6: Emulsion CE3 of an Amino-Functionalized Polydimethylsiloxane (Noninventive)

An Ultra-Turrax T 50 emulsifier (from Janke & Kunkel/IKA) is used at 5000 rpm to premix 6.0 g of C11-15 Pareth-7 (ethoxylated secondary alcohol, 7 ethylene oxide units), purchasable under the tradename Tergitol 15-S-7 (from Dow), and 1.9 g of hot, fully demineralized water. Weighed out into this premix are 1.0 g of lauryl ethoxylate-9 (ethoxylated primary alcohol, 9 ethylene oxide units), purchasable under the tradename Sympatens AL/090 (from KLK Kolb), 3.0 g of melted isotridecyl dodecaethoxylate, purchasable under the tradename Lutensol TO 12 (from BASF), and 1.9 g more of hot, fully demineralized water, and the mixture is homogenized at 5000 rpm for 2 minutes. Subsequently 2.3 g of 86% glycerol are metered in and the mixture is homogenized at 5000 rpm for a further 2 minutes. Added to this mixture are 20.0 g of a hydroxy/methoxy-terminated copolymer of 3-(2-aminoethylamino)propylmethylsiloxy units and dimethylsiloxy units, having an amine number of 0.25 mequ/g and a viscosity of 1500-2100 $mm^2/s$ (25.0° C.; capillary no. IIIc) in three portions, with homogenization in each case for 2 minutes with shearing at 5000 rpm. Addition of 0.9 g of 2-phenoxyethanol, purchasable under the tradename S&M Phenoxyethanol (Schülke and Mayr GmbH and CO KG), and 0.4 g of 80% acetic acid is followed by homogenization at 5000 rpm for a further 2 minutes. Slow dilution takes place with 62.6 g of fully demineralized water in portions of 4000 rpm to give the desired emulsion.

This gives a transparent to opalescent, colorless microemulsion of low viscosity with a solids content of 33% and a pH of 5.0.

Example 7: Emulsion E4 of an Amino-Functionalized Polydimethylsiloxane Crosslinked with an Oxalamidoester-Terminated Polyether An Ultra-Turrax T 50 emulsifier (from Janke & Kunkel/IKA) is used at 5000 rpm to homogenize 99.26 g of the emulsion CE1 with 0.74 g of oxalamidoester-terminated polyether A (~5 wt % based on amino-functionalized polydimethylsiloxane) over the course of a minute. This gives a transparent to slightly hazy, colorless to minimally yellowish, emulsion E4 of low viscosity with a solids content of 28% and a pH of 5.0.

After a drying time of 1-3 days at 25° C., evaporation of the emulsion gives a pronounced, whitish, elastic, soft film which adheres well to aluminum and is not tacky on the surface.

Example 8: Emulsion E5 of an Amino-Functionalized Polydimethylsiloxane Crosslinked with an Oxalamidoester-Terminated Polyether An Ultra-Turrax T 50 emulsifier (from Janke & Kunkel/IKA) is used at 5000 rpm to homogenize 99.70 g of the emulsion CE1 with 0.30 g of oxalamidoester-terminated polyether B (~2 wt % based on amino-functionalized polydimethylsiloxane) over the course of a minute. This gives a transparent to slightly hazy, colorless to minimally yellowish, emulsion E5 of low viscosity with a solids content of 27% and a pH of 5.0.

After a drying time of 1-3 days at 25° C., evaporation of the emulsion gives a pronounced, whitish, elastic, soft film which adheres well to aluminum and is not tacky on the surface.

Example 9: Emulsion E6 of an Amino-Functionalized Polydimethylsiloxane Crosslinked with an Oxalamidoester-Terminated Polyether An Ultra-Turrax T 50 emulsifier (from Janke & Kunkel/IKA) is used at 5000 rpm to homogenize 98.52 g of the emulsion CE1 with 1.48 g of oxalamidoester-terminated polyether C (~10 wt % based on amino-functionalized polydimethylsiloxane) over the course of a minute. This gives a hazy, colorless to minimally yellowish, emulsion E6 of low viscosity with a solids content of 28% and a pH of 5.0.

After a drying time of 1-3 days at 25° C., evaporation of the emulsion gives a whitish, elastic, soft film which adheres well to aluminum and is not tacky on the surface.

Example 10: Emulsion E7 of an Amino-Functionalized Polydimethylsiloxane Crosslinked with an Oxalamidoester-Terminated Polyether An Ultra-Turrax T 50 emulsifier (from Janke & Kunkel/IKA) is used at 5000 rpm to homogenize 97.00 g of the emulsion CE3 with 3.00 g of oxalamidoester-terminated polyether A (~15 wt % based on amino-functionalized polydimethylsiloxane) over the course of a minute. This gives a slightly hazy, minimally yellowish, emulsion E7 of low viscosity with a solids content of 35% and a pH of 4.5.

After a drying time of 1-3 days at 25° C., evaporation of the emulsion gives a whitish, elastic, soft film which adheres well to aluminum and is not tacky on the surface.

Example 11: Emulsion E8 of an Amino-Functionalized Polydimethylsiloxane Crosslinked with an Oxalamidoester-Terminated Polyether An Ultra-Turrax T 50 emulsifier (from Janke & Kunkel/IKA) is used at 5000 rpm to homogenize 99.20 g of the emulsion CE3 with 0.80 g of oxalamidoester-terminated polyether B (~4 wt % based on amino-functionalized polydimethylsiloxane) over the course of a minute. This gives a transparent, minimally yellowish, emulsion E8 of low viscosity with a solids content of 34% and a pH of 4.5.

After a drying time of 1-3 days at 25° C., evaporation of the emulsion gives a pronounced, whitish, elastic, soft film which adheres well to aluminum and is not tacky on the surface.

Example 12: Emulsion E9 of an Amino-Functionalized Polydimethylsiloxane Crosslinked with an Oxalamidoester-Terminated Polyether An Ultra-Turrax T 50 emulsifier (from Janke & Kunkel/IKA) is used at 5000 rpm to homogenize 96.00 g of the emulsion CE3 with 4.00 g of oxalamidoester-terminated polyether C (~20 wt % based on amino-functionalized polydimethylsiloxane) over the course of a minute. This gives a hazy, minimally yellowish, emulsion E9 of low viscosity with a solids content of 36% and a pH of 4.5.

After a drying time of 1-3 days at 25° C., evaporation of the emulsion gives a whitish, elastic, very soft film which adheres well to aluminum and is not tacky on the surface.

(Comparative) Example 13: Emulsion CE10 of a Linear Oxalamidoester-Polyether-Bridged Polydimethylsiloxane Emulsion CE10 is produced in analogy to example 1 of WO 2019/114953 A1:

A 500 ml 3-neck flask with thermocouple, KPG stirrer and reflux condenser was charged with 100 g (20 mmol) of a linear oxamidoester-terminated silicone oil (5065 g/mol). Added at 22° C. over the course of 10 minutes with stirring were 3.74 g (20 mmol) of TA 187 (=$N^1$-(3-(dimethylamino)propyl)-$N^3,N^3$-dimethylpropane-1,3-diamine, purchasable from SIGMA-ALDRICH, MERCK, Darmstadt, Germany) and subsequently 6.6 g (10 mmol) of JEFFAMINE® ED-600 (available from Huntsman Performance Products, Everslaan 45, B-3078 Everberg, Belgium). This was followed by stirring for 30 minutes more. Thereafter the reaction product was freed from the resultant alcohol at 40° C. under a pressure of 20 hPa. This gave 107 g of an opaque oligomeric product. 21.2 g of the product obtained are mixed in 4.7 g of diethylene glycol monobutyl ether (available from Sigma-Aldrich Chemie GmbH, Taufkirchen, Germany) and 4.1 g of tridecyl alcohol ethoxylate (available as LUTENSOL® TO from BASF SE, Ludwigshafen) and then slowly diluted with 70.0 g of water and adjusted to a pH of 4.5 with 80% acetic acid.

Example 14

The degree of crosslinking was determined using the following emulsions described in table 1. The emulsions here are poured into aluminum trays, and the appearance of the emulsions was evaluated following the removal of the water.

TABLE 1

| Crosslinking experiments C1 to C9 | |
|---|---|
| Emulsions | Film formation |
| C1 *) containing CE1 | after 1 day: p, o; no film |
| C2 *) containing CE3 | after 1 day: p, o; no film |

TABLE 1-continued

Crosslinking experiments C1 to C9

| Emulsions | Film formation |
|---|---|
| C3 *) containing CE10 | after 1 day: p, o; no film |
| C4 **) containing E4 | after 1 day: e, s; film |
| C5 **) containing E5 | after 1 day: e, s; film |
| C6 **) containing E6 | after 1 day: pc, p; incipient film-forming<br>after 3 days: e, s; film |
| C7 **) containing E7 | after 1 day: g-e; film<br>after 3 days: e, s; film |
| C8 **) containing E8 | after 1 day: g-e; film<br>after 3 days: e, s; film |
| C9 **) containing E9 | after 1 day: p, no film<br>after 3 days: pc-g-e; incipient film-forming<br>after 1 week: g-e; film |

Key:
pc = partly crosslinked; e = elastic; g = gellike; o = oily; P = pasty; s = soft.
*) not inventive;
**) inventive Example 15: Determination of the Crease Recovery Angle The performance tests relating to the determination of the crease recovery angle took place using the following aqueous formulations described in table 2. The amount of polyoxysiloxane-containing emulsions is selected such that the polysiloxane content (except for the blank value F1) is always the same.

TABLE 2

Aqueous formulations F1 to F8

| Formulations | Polyoxysiloxane-containing emulsion | Water |
|---|---|---|
| F1 (blank value) | — | 100.0 g |
| F2 *) | 10.8 g CE2 | 89.2 g |
| F3 **) | 10.8 g E4 | 89.2 g |
| F4 **) | 10.8 g E5 | 89.2 g |
| F5 **) | 10.8 g E6 | 89.2 g |
| F6 **) | 8.0 g E7 | 92.0 g |
| F7 **) | 8.0 g E8 | 92.0 g |
| F8 **) | 8.0 g E9 | 92.0 g |

*) noninventive
**) inventive

The formulations (both inventive and noninventive) are produced by simple mixing of the constituents (with the aid of an IKA Eurostar Power basic agitator mechanism with paddle stirrer).

For assessment of the desired effects in terms of the crease recovery angle:

Textile strips 2×5 cm are taken from a wfk 10 A cotton test fabric (100% cotton with around 170 g/m² basis weight) from wfk-Testgewebe, this fabric having been washed twice with a commercial heavy-duty powder detergent at 90° C.

The aqueous formulations F1 to F8 (see table 2) are sprayed onto the textile strips using a trigger spray. The mass of the formulations F1 to F8 applied by spraying is selected such that it is the same as the mass of the textile strip. The textile strips are dried overnight on the line, conditioned for 24 hours in a conditioning chamber at 23° C./60% humidity, and then ironed with an iron on "cottons" setting.

The crease recovery angle is determined by the method of DIN 53 890/1972:

Each textile strip is folded over in transverse direction, so that the length of the sample flank to be laid over is 10 mm. An aluminum foil 0.15 mm in thickness is placed under the sample flank to be laid over, in order to prevent the fibers adhering. The sample is covered with a microscope slide and weighted down with a 1000 g weight such that the weight rests on the overlaid sample flank only. The weighting time is 30 min.

After the weight on the microscope slide has been removed, the gradually increasing crease recovery angle is determined after 5 and 30 min on both sides of the angle flank, using a protractor.

At least ten samples should be prepared and measured for each textile. The measurement results reported are the averages from the respective determinations.

TABLE 3

Determination of the crease recovery angle on wfk 10 A cotton test fabric
Crease recovery angle after spray application and drying

| Formulations | After 5 min |
|---|---|
| F1 (blank value) | 42.4° ± 1.7° |
| F2 *) | 66.6° ± 2.4° |
| F3 **) | 75.6° ± 2.9° |
| F4 **) | 72.6° ± 2.0° |
| F5 **) | 69.0° ± 1.8° |
| F6 **) | 70.4° ± 2.1° |
| F7 **) | 69.8° ± 1.1° |
| F8 **) | 80.8° ± 2.7° |

*) contains noninventive emulsion containing an uncrosslinked amino- functional polydiorganosiloxane
**) contains inventive emulsion containing a crosslinked hydrophilic polydiorganosiloxane The modification of the textiles with the formulations F3 to F8, containing the inventive emulsions E4 to E9, results in a significant increase in crease recovery angle relative to a textile sprayed only with water (blank value F1).

The comparison with formulation F2 as well, which contains the noninventive emulsion CE2 of an uncrosslinked amino-functionalized polydimethylsiloxane, shows that the inventive formulations F3 to F8, particularly the formulations F3 and F8, exhibit an increased crease recovery angle.

Consequently a significantly reduced propensity to creasing than is provided by the prior art is achieved when using the emulsions of the invention in textile products whose function is to reduce or suppress creasing in textiles, such as clothing.

Example 16: Droplet Absorption Time

The performance tests relating to the determination of the droplet absorption time took place using the aqueous formulations F2 to F5 described in table 2 (example 15).

A wfk 10 A cotton test fabric from wfk-Testgewebe is modified in accordance with the method as described in example 15.

One droplet of deionized water was placed from a height of 4 cm onto the stretched fabric surface of the textile thus modified, after drying, and a determination was made of the time for the water droplet to have been absorbed by the fabric. Five determinations were conducted, and the average was formed.

TABLE 4

Determination of the droplet absorption time on
wfk 10 A cotton test fabric
Droplet absorption time on wfk 10 A cotton test fabric
after spray application

| Formulations | Absorption time in seconds |
|---|---|
| F2 (noninventive) | 32 ± 2 |
| F3 (inventive) | 14 ± 3 |
| F4 (inventive) | 21 ± 3 |
| F5 (inventive) | 17 ± 2 |

The modification of the cotton test fabric with the formulations F3 to F5 containing the inventive emulsions E4 to E6 leads to a significantly reduced droplet absorption time on cotton test fabric, relative to the modification with the formulation F2 containing the noninventive emulsion CE2 of an uncrosslinked amino-functionalized polydimethylsiloxane. As a result, significantly better water absorption is achieved for the textile than in the prior art.

Example 17: Soft Hand in Application as a Fabric Softener Ingredient

The performance tests relating to the determination of the soft hand took place using the following aqueous formulations described in table 5.

TABLE 5

Aqueous formulations F9 to F13

| Formulations | Polyoxysiloxane-containing emulsion | Cationic surfactant ***) | Water |
|---|---|---|---|
| F9 *) | — | 4.0 g | 36.0 g |
| F10 **) | 1.4 g E4 | 2.4 g | 36.2 g |
| F11 **) | 1.4 g E5 | 2.40 g | 36.2 g |
| F12 **) | 1.4 g E6 | 2.40 g | 36.2 g |
| F13 *) | 1.4 g VE1 | 2.40 g | 36.2 g |

*) noninventive
**) inventive
***) N,N-bis[ethyl(tallowate)]-N-(2-hydroxyethyl)-N-methylammonium methylsulfate (90% ethanolic solution), purchasable under the tradename Stepantex® VK90 (from Stepan)

To assess the desired effects in terms of soft hand, six terry hand towels made of cotton fabric were washed together with around 2 kg of ballast fabric in a MIELE Softronic W 1935 WPS EcoLine household washing machine using the boil/color wash program at 40° C. and spun at 1200 rpm. The washing surfactant metered in here was 65 g of an ECE-2 test laundry detergent powder from WFK. After the wash cycle, the formulation F9 to F13 (pre-diluted in 1 liter of tap water of 16° dH [German hardness]) is added via the detergent drawer. Lastly the material was dried for at least 12 hours in a conditioning chamber at 23° C. and 60% atmospheric humidity on the line.

Determination of the Soft Hand (Hand Evaluation)

Because the soft hand of textiles is greatly subject to the subjective perception of the testers, the boundary conditions only, but not the evaluation, can be standardized. In order to ensure reproducibility nevertheless, the modified specimens were assessed for their soft hand and ranked. For this purpose, 10 testers awarded 1 to n marks, depending on the number n of specimens tested, where n marks were rewarded for the softest specimen and 1 mark for the specimen modified with the lowest softness. The unmodified reference specimen received 0 marks. The evaluation of the hand of a specimen is computed accordingly as the average of the points apportioned to that specimen respectively.

TABLE 6

Soft hand assessment on terry cloth
Soft hand assessment on terry cloth (basis weight: 500 g/m²) after
washing machine treatment and drying

| Formulations | Soft hand |
|---|---|
| F9 (noninventive) | +++ |
| F10 (inventive) | ++ |
| F11 (inventive) | ++ |
| F12 (inventive) | +++ |
| F13 (noninventive) | + |

+++ excellent softness,
++ very soft,
+ soft,
o hard

The modification of the textile with the inventive formulations F10 to F12 leads to a significantly improved soft hand relative to the prior-art formulation F13 (containing emulsion CE1 of an uncrosslinked amino-functionalized diorganopolysiloxane), which has a lower soft hand.

The combination of cationic surfactant and, in particular, of the inventive emulsion in formulation F12 leads, further, to a soft hand which is otherwise attainable only with a significantly increased cationic surfactant content, as in formulation F9. This leads to a reduced use of raw materials, which represents a distinct improvement on the prior art both environmentally and economically.

The invention claimed is:

1. An aqueous dispersion comprising
(1) precrosslinked organopolysiloxanes which comprise units of the formula $$R^2SiO_{2/2} \qquad (I),$$

and on average at least one structural unit of the formula $$SiR^1O_{2/2}—Y—SiR^1O_{2/2} \qquad (III)$$

where
Y is a divalent radical of the formula $$—R^2—[NR^3—R^4-]_nNR^3·C(O)—C(O)—NR^3—Z—NR^3—C(O)—C(O)—NR^3—[R^4—NR^3—],R^2—$$

Z is identical or different and is a divalent organic radical containing a polyoxyalkylene group,
R may be identical or different and is a monovalent, unsubstituted or substituted, saturated or unsaturated hydrocarbon radical having 1 to 18 carbon atoms,
$R^1$ may be identical or different and is a radical R or a radical-O—$R^7$,
$R^2$ is an SiC-bonded, divalent linear or branched hydrocarbon radical having 1 to 18 carbon atoms,
$R^3$ is a hydrogen atom, an alkyl radical having 1 to 8 carbon atoms or an acyl radical,
$R^4$ is a divalent hydrocarbon radical having 1 to 6 carbon atoms,
$R^5$ is identical or different and is a $C_1$-$C_{10}$ alkylene radical,
$R^6$ is a $C_1$-$C_{10}$ alkylene radical,
$R^7$ may be identical or different and is hydrogen or a monovalent hydrocarbon radical which has 1 to 18 carbon atoms and may be interrupted by one or more separate oxygen atoms,
n is 0, 1, 2, 3 or 4 and
m is an integer and is on average 1 to 80, (2) emulsifiers, and
(3) water.

2. The aqueous dispersion as claimed in claim 1, wherein the precrosslinked organopolysiloxanes (1) comprise structural units of the formula $$R^1ASiO_{2/2} \quad (II)$$

where
A may be identical or different and is a radical of the formula $$-R^2-[NR^3-R^4-]_nNR^3_2$$

where
R may be identical or different and is a monovalent, unsubstituted or substituted, saturated or unsaturated hydrocarbon radical having 1 to 18 carbon atoms,
$R^1$ may be identical or different and is a radical R or a radical $-O-R^7$,
$R^2$ is an SiC-bonded, divalent linear or branched hydrocarbon radical having 1 to 18 carbon atoms,
$R^3$ is a hydrogen atom, an alkyl radical having 1 to 8 carbon atoms or an acyl radical,
$R^4$ is a divalent hydrocarbon radical having 1 to 6 carbon atoms, and
n is 0, 1, 2, 3 or 4.

3. The aqueous dispersion as claimed in claim 1, wherein the precrosslinked organopolysiloxanes (1) are selected from the group of the formulae $$[ARSiO_{2/2}]_j[RSiO_{2/2}]_k[R_2SiO_{2/2}]_l[R_{3-e}(OR^7)_eSiO_{1/2}]_2 \quad (IVa)$$
$$|$$
$$Y$$
$$|$$
$$[ARSiO_{2/2}]_j[RSiO_{2/2}]_k[R_2SiO_{2/2}]_l[R_{3-e}(OR^7)_eSiO_{1/2}]_2,$$

$$[A(OR^7)SiO_{2/2}]_j[(OR^7)SiO_{2/2}]_k[R_2SiO_{2/2}]_l[R_{3-e}(OR^7)_eSiO_{1/2}]_2 \quad (IVb)$$
$$|$$
$$Y$$
$$|$$
$$[A(OR^7)SiO_{2/2}]_j[(OR^7)SiO_{2/2}]_k[R_2SiO_{2/2}]_l[R_{3-e}(OR^7)_eSiO_{1/2}]_2$$

and mixtures thereof,
where
R may be identical or different and is a monovalent, unsubstituted or substituted, saturated or unsaturated hydrocarbon radical having 1 to 18 carbon atoms,
Y is a divalent radical of the formula $$-R^2-[NR^3-R^4-]_nNR^3-C(O)-C(O)-NR^3-$$
$$Z-NR^3-C(O)-C(O)-NR^3-[R^4-$$
$$NR^3-]_nR^2-$$

Z is identical or different and is a divalent organic radical containing a polyoxyalkylene group,
$R^2$ is an SiC-bonded, divalent linear or branched hydrocarbon radical having 1 to 18 carbon atoms,
$R^3$ is a hydrogen atom, an alkyl radical having 1 to 8 carbon atoms or an acyl radical,
$R^4$ is a divalent hydrocarbon radical having 1 to 6 carbon atoms,
$R^7$ may be identical or different and is hydrogen or a monovalent hydrocarbon radical which has 1 to 18 carbon atoms and may be interrupted by one or more separate oxygen atoms, A may be identical or different and is a radical of the formula $$-R^2-[NR^3-R^4-]_nNR^3_2,$$

e is 0 or 1,
j is 0 or an integer between 1 and 15,
k is at least 1 and at most 15, and
l is at least 40 and at most 1000.

4. The aqueous dispersion as claimed in claim 1, characterized in that following the removal of the water, the precrosslinked organopolysiloxanes form elastomeric films.

5. A precrosslinked organopolysiloxane (1) which comprises units of the formula $$R_2SiO_{2/2} \quad (I),$$

and on average at least one structural unit of the formula $$SiR^1O_{2/2}-Y-SiR^1O_{2/2} \quad (III)$$

where
Y is a divalent radical of the formula $$-R^2-[NR^3-R^4-]_nNR^3\cdot C(O)-C(O)-NR^3-Z-$$
$$NR^3-C(O)-C(O)-NR^3-[R^4-NR^3-]_nR^2-$$

Z is identical or different and is a divalent organic radical containing a polyoxyalkylene group,
R may be identical or different and is a monovalent, unsubstituted or substituted, saturated or unsaturated hydrocarbon radical having 1 to 18 carbon atoms,
$R^1$ may be identical or different and is a radical R or a radical $-O-R^7$,
$R^2$ is an SiC-bonded, divalent linear or branched hydrocarbon radical having 3 to 18 carbon atoms,
$R^3$ is a hydrogen atom, an alkyl radical having 1 to 8 carbon atoms or an acyl radical,
$R^4$ is a divalent hydrocarbon radical having 1 to 6 carbon atoms,
$R^5$ is identical or different and is a $C_1$-$C_{10}$ alkylene radical,
$R^6$ is a $C_1$-$C_{10}$ alkylene radical,
$R^7$ may be identical or different and is hydrogen or a monovalent hydrocarbon radical which has 1 to 18 carbon atoms and may be interrupted by one or more separate oxygen atoms,
n is 0, 1, 2, 3 or 4, and
m is an integer and is on average 1 to 80.

6. A process for producing the aqueous dispersions of precrosslinked organopolysiloxanes (1), wherein organopolysiloxanes (4) which comprise units of the formula $$R_2SiO_{2/2} \quad (I),$$

and on average at least one structural unit of the formula $$R^1ASiO_{2/2} \quad (II)$$

where
R may be identical or different and is a monovalent, unsubstituted or substituted, saturated or unsaturated hydrocarbon radical having 1 to 18 carbon atoms,
$R^1$ may be identical or different and is a radical R or a radical $-O-R^7$,
A may be identical or different and is a radical of the formula $$-R^2-[NR^3-R^4-]_nNR^3_2,$$

$R^2$ is an SiC-bonded, divalent linear or branched hydrocarbon radical having 1 to 18 carbon atoms,
$R^3$ is a hydrogen atom, an alkyl radical having 1 to 8 carbon atoms or an acyl radical, $R^4$ is a divalent hydrocarbon radical having 1 to 6 carbon atoms, $R^7$ may be identical or different and is hydrogen or a monovalent hydrocarbon radical which has 1 to 18 carbon atoms and may be interrupted by one or more separate oxygen atoms, and n is 0, 1, 2, 3 or 4, are reacted with oxalamidoester-terminated polyethers (5) of the formula (V)

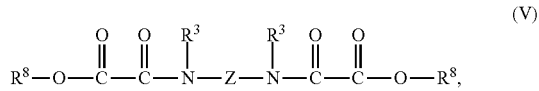
(V)

where

Z is identical or different and is a divalent organic radical containing a polyoxyalkylene group, and $R^8$ is identical or different and is a monovalent hydrocarbon radical which has 1 to 18 carbon atoms and may be interrupted by one or more separate oxygen atoms, in the presence of emulsifiers (2) and water (3).

7. The process as claimed in claim 6, wherein organopolysiloxanes (4) used comprise those selected from the group of the formulae $$[ARSiO_{2/2}]_j[R_2SiO_{2/2}]_l[R_{3-e}(OR^7)_eSiO_{1/2}]_2 \quad (VIa),$$

$$[A(OR^1)SiO_{2/2}]_j[R_2SiO_{2/2}]_l[R_{3-e}(OR^7)_eSiO_{1/2}]_2 \quad (VIb),$$

and mixtures thereof, where

R may be identical or different and is a monovalent, unsubstituted or substituted, saturated or unsaturated hydrocarbon radical having 1 to 18 carbon atoms, $R^1$ may be identical or different and is a radical R or a radical $-O-R^7$, A may be identical or different and is a radical of the formula

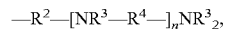

$R^2$ is an SiC-bonded, divalent linear or branched hydrocarbon radical having 1 to 18 carbon atoms, $R^3$ is a hydrogen atom, an alkyl radical having 1 to 8 carbon atoms or an acyl radical, $R^4$ is a divalent hydrocarbon radical having 1 to 6 carbon atoms, $R^7$ may be identical or different and is hydrogen or a monovalent hydrocarbon radical which has 1 to 18 carbon atoms and may be interrupted by one or more separate oxygen atoms, and n is 0, 1, 2, 3 or 4, are reacted with oxalamidoester-terminated polyethers (5) of the formula (V)

e is 0 or 1, j is 0 or an integer between 1 and 15, and l is at least 40 and at most 1000.

8. A composition for treating substrates comprising the aqueous dispersions of claim 1.

9. The composition as claimed in claim 8, wherein the substrates are fibrous.

10. The composition as claimed in claim 9, characterized in that the fibrous substrates are textiles.

11. A composition for treating substrates, comprising the aqueous dispersions of precrosslinked organopolysiloxanes of claim 5.

12. A composition for treating substrates, comprising the aqueous dispersions produced as claimed in claim 6.

* * * * *